Figure 5:
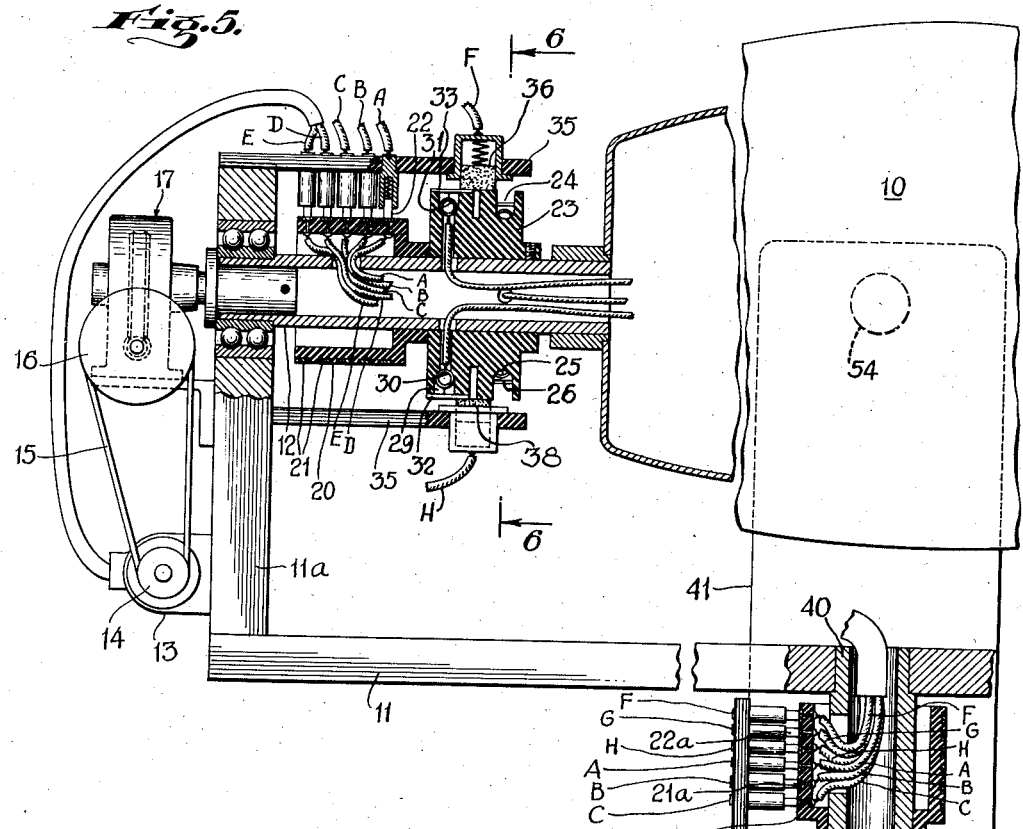

Oct. 18, 1949.    M. W. EDINBURG    2,485,266
TRAINING APPARATUS
Filed July 14, 1944    4 Sheets-Sheet 1
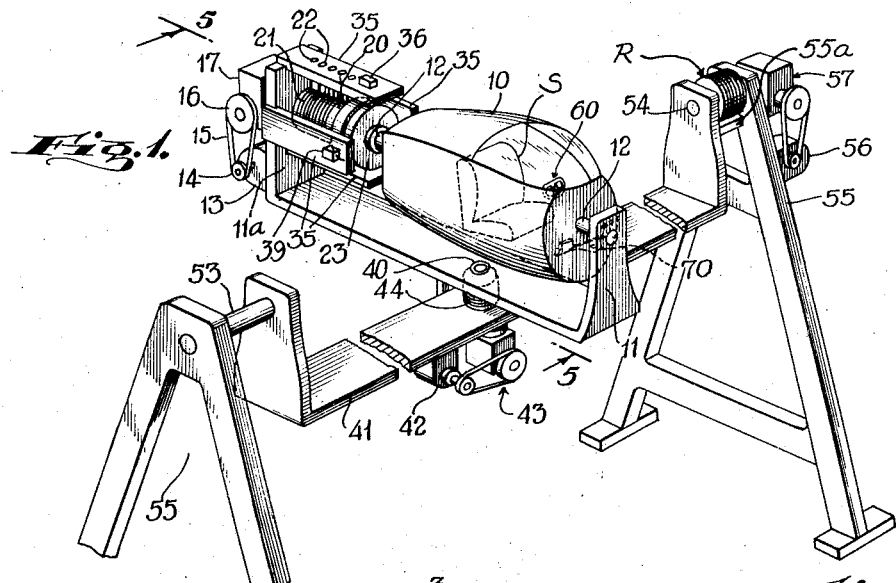
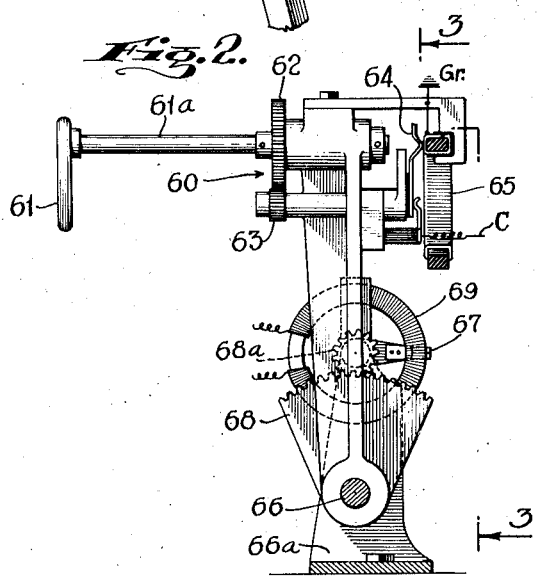
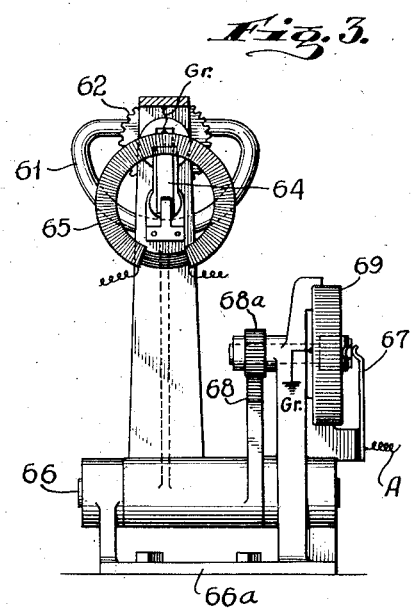
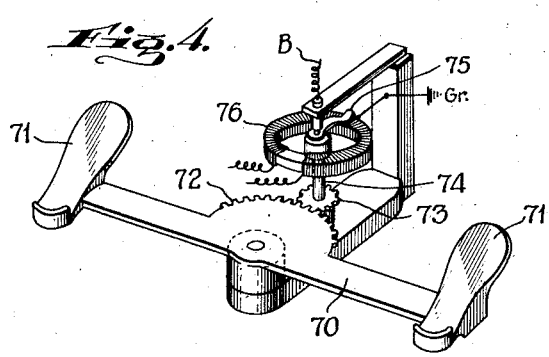
INVENTOR
Murray W. Edinburg
BY
ATTORNEY Oct. 18, 1949.   M. W. EDINBURG   2,485,266
TRAINING APPARATUS Filed July 14, 1944   4 Sheets-Sheet 2

INVENTOR
Murray W. Edinburg
BY
A. H. Golden
ATTORNEY

Oct. 18, 1949.   M. W. EDINBURG   2,485,266
TRAINING APPARATUS
Filed July 14, 1944   4 Sheets-Sheet 3
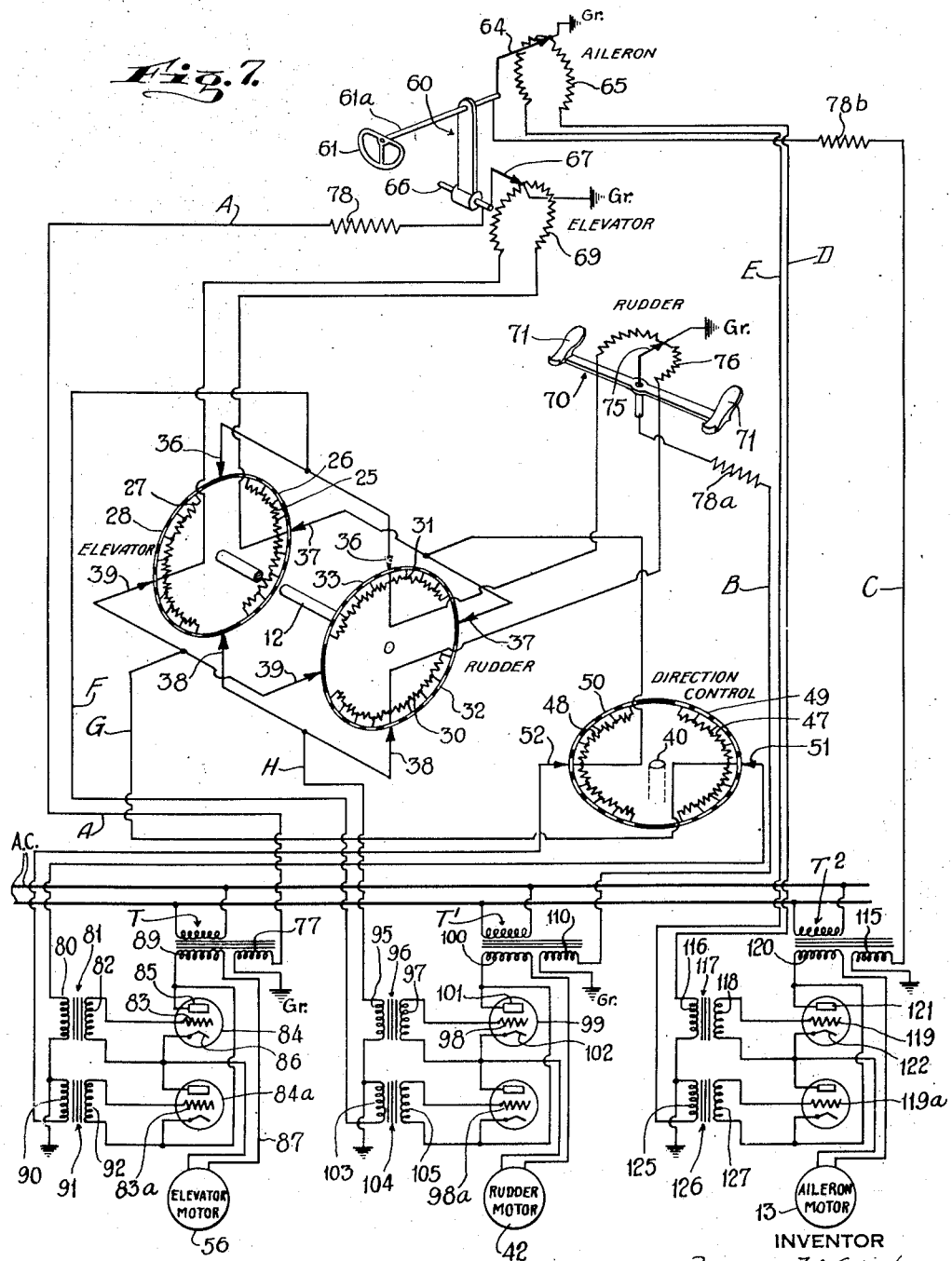
INVENTOR
Murray W. Edinburg
BY
A. H. Golden
ATTORNEY

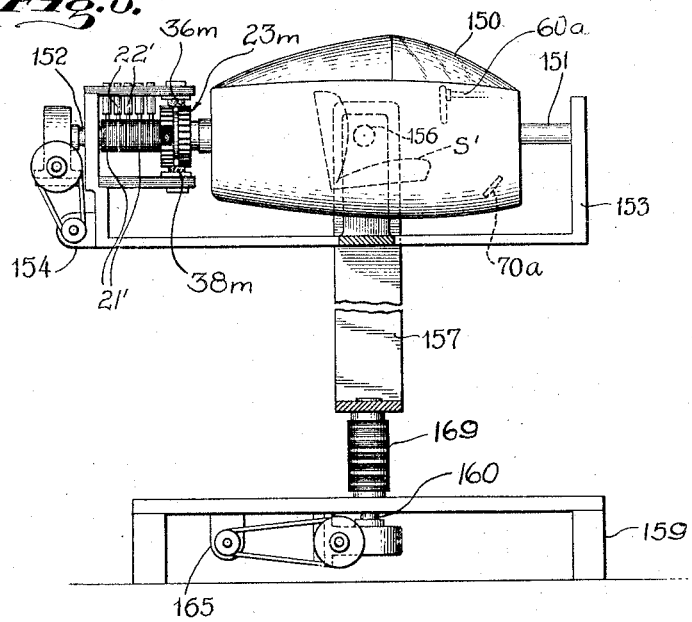
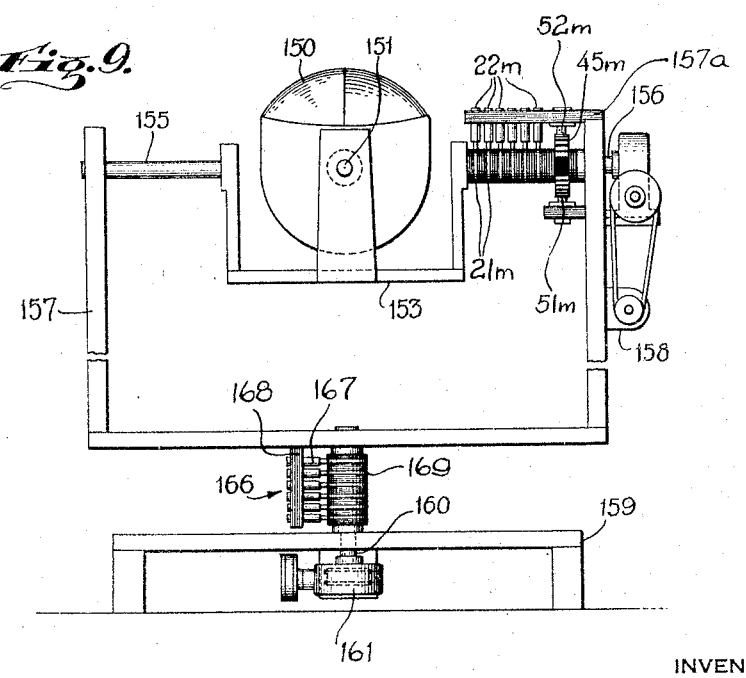

UNITED STATES PATENT OFFICE 2,485,266

TRAINING APPARATUS

Murray W. Edinburg, Worcester, Mass., assignor to Link Aviation, Inc., Binghamton, N. Y., a corporation of New York Application July 14, 1944, Serial No. 544,870

14 Claims. (Cl. 35—12)

This invention relates to an apparatus to be used for the training of pilots of airships. The object of the invention is the arrangement of a cockpit in which a student sits and operates the usual controls, means being provided for moving the cockpit in the same manner and degree that a real airship would be moved under the same operation of the controls. In other words, when the student pilot moves the stick and rudder bar, his cockpit is moved in the same direction and in the same degree as would a real ship. In this manner, the student is taught the nature of the controls, and the movement that will be contributed to an airship by a particular operation of the said controls.

I appreciate of course that others have attempted from time to time to develop apparatus of the general type indicated, but I believe that my invention hereinafter set forth forms a substantial advance in the art because it contributes an extremely effective apparatus capable of substantially simulating the movement of an airship; in addition, my invention contributes an apparatus that is extremely inexpensive to construct.

As a feature of my invention whereby the objects thereof are obtained, I utilize a cockpit that is preferably mounted for rotation about three axes, and thereby is movable into practically every desired position in the same manner as an actual airship. I use the term cockpit to designate that part of the apparatus in which the student pilot sits, but those skilled in the art will appreciate that for the particular purpose any type of movably mounted mechanism may be suitable. Also, while I shall describe the cockpit as moving in three axes and under stick and rudder bar control, as in the case of an actual ship, those skilled in the art will appreciate that it may be desirable under some circumstances to make the apparatus capable of movement about but two axes, or conceivably about only one axis. Therefore, while my invention in its fuller aspects embodies an apparatus that will move in the same manner as an actual airship, subcombinations thereof may be valuable and such subcombinations will be set forth in the claims appended hereto.

As a feature of my invention, a motor means is utilized to rotate the cockpit about a horizontal axis to contribute movement to the cockpit that is the equivalent of the movement contributed to an actual ship through movement of its stick when the wings of the ship are horizontal. This motor means I shall call the elevator motor or elevator axis motor. A second motor means is used for rotating the cockpit about its own axis to contribute rolling action to the ship such as that which results through movement of the ailerons of an actual airship. This motor means I shall call the aileron motor, or aileron axis motor.

It is a feature of my invention that the operation of the elevator motor for rotating the ship about the first or elevation axis is controlled by the position of the cockpit in its second or aileron axis. As a further feature of this portion of my invention, the cockpit has a rudder bar and stick, and it is the stick or rudder bar that is adapted to control the elevator axis motor depending on the position of the cockpit in the aileron axis. Thus, when the cockpit is in a horizontal position, equivalent to that of an airship with its wings horizontal, it is the stick that controls the elevator axis motor. When the cockpit is rotated ninety degrees so that it is in a position equivalent to that of an airship with its wings vertical, it is the rudder bar that controls the elevator axis motor. Thus, since in an actual ship in this position it is the rudder bar that controls elevation, so in my invention it is the rudder bar that controls the elevation axis motor.

The manner in which the elevator motor is controlled either by the stick or rudder bar, depending on the position of the cockpit, forms the basis of my invention. As a further feature of the invention, this control utilizes control means preferably rotatable with the cockpit about the aileron axis, for regulating the response of the elevator axis motor to the stick or rudder bar, and to both the stick and rudder bar in positions intermediate the extreme positions I have set forth.

A third motor means called by me the rudder axis motor, is adapted to rotate the cockpit about a third axis perpendicular to the elevator axis. The rudder axis motor of course contributes movement to the cockpit equivalent to that movement which is contributed to an actual airship by the throw of its rudder bar when the airship is moving with its wings horizontal. Control is exercised over the rudder axis motor by the stick or rudder bar, depending on the rotated position of the cockpit about the aileron axis. Actually, the control of the rudder axis motor is opposite, but otherwise exactly that which is exercised over the elevator axis motor.

A further feature of my invention relates to the construction and operation of the stick for controlling the operation of the rudder axis motor, the elevator axis motor, and the aileron axis motor.

Still a further feature of my invention resides in the construction of the rudder bar and the means whereby it controls the rudder axis motor and the elevator axis motor.

A further feature of my invention resides in the ultilization of particular control mechanism for the several motors whereby they are readily controlled in their speed and direction. A more particular feature of this portion of my invention resides in the utilization of electric motors controlled by thyratron tubes.

I have found that dependent on the control of the rudder axis and elevator axis motors, it is necessary to reverse the direction of operation of one of said motors in certain positions of the cockpit. In one modification of my invention, the direction of operation of the elevator axis motor must be reversed when the cockpit is rotated to a particular directional position by operation of the rudder axis motor. In a second modification, the direction of operation of the rudder axis motor must be reversed when the cockpit is rotated by the elevator axis motor into a particular position. A further feature of one modification of my invention resides in the arrangement of control mechanism operated in the rudder axis for controlling the direction and degree of operation of the elevator axis motor; while in the second modification similar control mechanism is operated by the elevator axis motor for controlling the rudder axis motor.

I have thus described generally the several more important features of my invention in order that the nature of my contribution to the art may be better understood. There are of course a number of additional very important features that are best understood after a study of the specific apparatus of my invention. Changes may be made from the disclosed embodiment of the invention without departing from the substance thereof.

Figure 6:
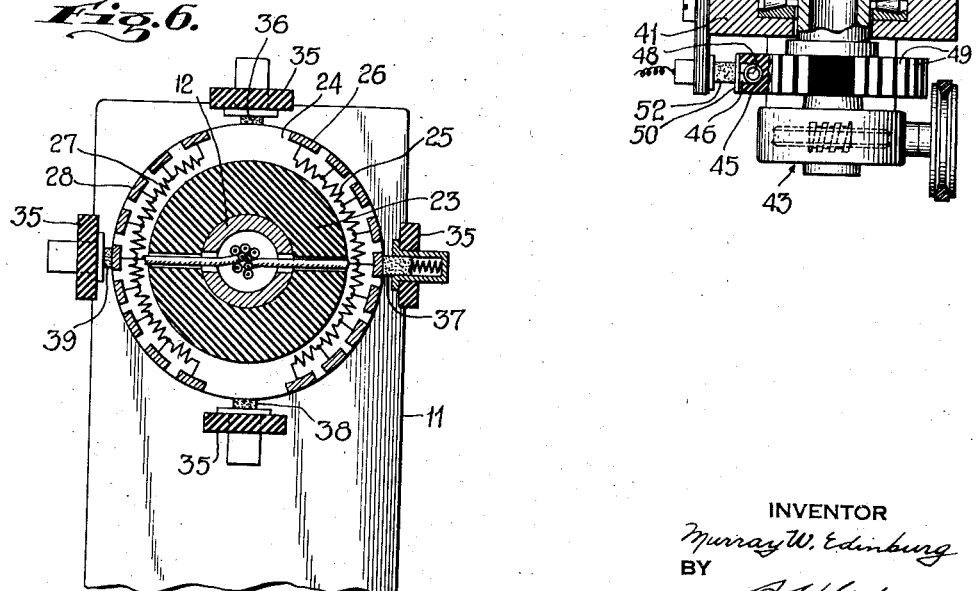

For an understanding of my invention I shall refer to the drawings wherein Fig. 1 is a perspective diagrammatic view showing the mechanical structure of my apparatus. Fig. 2 is an elevation of the stick and the electrical means preferably controlled thereby. Fig. 3 is a section taken along lines 3—3 of Fig. 2. Fig. 4 is a perspective view of the rudder bar and the electrical means controlled thereby. Fig. 5 is a section taken along lines 5—5 of Fig. 1. Fig. 6 is a section taken along lines 6—6 of Fig. 5. Fig. 7 is a wiring diagram of my invention and probably best illustrates its operation. Fig. 8 is an elevation of a modification of my invention. Fig. 9 is a view taken from the right of Fig. 8 looking toward Fig. 8.

Referring now more particularly to the drawings and especially Fig. 1, reference numeral 10 designates a cockpit that is mounted for rotation relatively to a large bracket 11. This rotation is about the axis of forward and rear shafts 12, this axis being called by me the aileron axis. In other words, any rotation that is contributed about the axis of shafts 12 is that rotation that would be imparted to an actual airship through movement of the ailerons of that airship. The motor that rotates the cockpit 10 about the aileron axis is designated by reference numeral 13 and is here shown to be an electric motor for driving a pulley 14 that through a belt 15 drives a pulley 16 for actuating suitable gearing within a casing 17 and thereby rotating the rear hollow shaft 12 relatively to bracket 11. It is conceivable that other types of motors may be utilized by those skilled in the art but I prefer the electric motor 13, controlled as hereinafter set forth by thyratron tubes.

Mounted for rotation with the rear hollow shaft 12 is a sleeve-like insulation member 20 having a series of circular metal rings 21 cooperating with a series of brushes 22 that are the terminal points of conductors A, B, C, D and E, the function of which will be described presently. The rings 21 in contact with the brushes of the conductors A, B, C, D and E have leading therefrom conductors that are also designated by reference letters A, B, C, D and E, this form of nomenclature being utilized for simplifying the description of the invention. Conductors A, B, C, D and E extend to cockpit 10 for a purpose hereinafter made quite clear.

Mounted for rotation on the rear shaft 12 is an insulation body 23 shown best in section in Fig. 6. In that plane in which the section of Fig. 6 is taken, the insulation member is grooved as at 24 for the mounting therein of a resistance element 25 that is tapped at spaced points to commutator segments 26. Mounted also within the groove 24 is a second resistance element 27 exactly the same as resistance 25 and similarly having spaced commutator segments 28. As best seen in Fig. 5, the insulation body 23 is formed with a second groove 29, and mounted within this groove 29 are two resistances 30 and 31 similar to resistances 25 and 27. These resistances have commutator segments 32 and 33, all as is well shown in Fig. 7, in the same relation thereto as are the commutator segments 26 and 28 to the resistances 25 and 27 respectively. It is well to note that all four resistances are center tapped and that the resistances in each groove 24, 29 are separated by insulation.

A series of four arms 35 are secured to the vertical arm 11a of the large bracket 11, and it is in the upper of these arms that the series of brushes 22 are mounted. An additional four brushes designated by reference numerals 36, 37, 38 and 39 are mounted in the said arms 35. Each of the several brushes 36—39 is sufficiently wide so as to contact both the segments 26, 28 in the plane of Fig. 6 and the segments 32, 33 of the resistances 30 and 31. In Fig. 7 each brush 36—39 is shown diagrammatically in the form of a pair of arrows in spaced relation and adapted for contact with the segments of each of the pairs of resistances 25, 27 and 30, 31 in the two grooves. In the neutral position of Figs. 1, 6 and 7, each brush will be in contact with a resistance and also with an insulation section. It may be well at this point to indicate that the resistances 30, 31 are used for controlling the rudder axis motor while the resistances 25, 27 are used for controlling the elevator axis motor, all as will appear presently.

Referring now back again to Figs. 1 and 5, the large bracket 11 has fixed thereto a hollow shaft 40 whereby it is adapted for rotation relatively to a second bracket 41. It is rotated relatively to the bracket 41 by what I call a rudder axis motor 42, that through suitable mechanical means 43 rotates the shaft 40. The several means used in mechanical means 43 are similar to those utilized in connection with the aileron motor 13 and no further emphasis need be placed thereon at this time. It may be well to indicate that the mechanical means shown herein are merely diagrammatic and that many other mechanical mechanisms may equally well be utilized for carrying out the contribution of my invention.

Fixed on the shaft 40 is an insulation sleeve 44 similar to insulation sleeve 20 secured on the shaft 12. A series of rings 21a similar to rings 21 are secured on the insulation sleeve 44 and are in contact with a series of brushes 22a similar to brushes 22. The several brushes 22a are at the terminal ends of conductors A, B, C, F, G, H and the several rings 21a have leading therefrom a series of conductors that are in effect continuations of the said conductors A, B, C, F, G, H. It is well at this point to note that conductors A, B and C lead to the brushes 22 and thence from the rings 21 through the holow shaft 12 toward the cockpit. These conductors and the conductors F, G and H will be further referred to hereinafter. It is well to note that for convenience, the functionally continuous conductors will bear the same reference letter.

Carried also on the shaft 40 is an insulation ring 45 similar in character to the insulation body 23 but considerably narrower. This insulation ring 45 is grooved at 46 for the housing of a pair of resistances 47, 48 best illustrated in Fig. 7. These resistances are very similar to those found in insulation body 23 and are similarly tapped to a series of contact segments 49 and 50. Opposed brushes 51 and 52 are utilized for contacting the segments 49, 50, for a purpose hereinafter set forth, it being understood that either of the brushes 51, 52 may make adequate contact with any of the segments 49, 50. Brushes 51, 52 are of course fixed to bracket 41 so that resistances 47, 48 will rotate relatively to the brushes with cockpit 10.

The bracket 41 is mounted through shafts 53, 54 for rotation about fixed standards 55. This rotation is contributed by an elevator axis motor 56 through suitable mechanical means 57, in much the same manner as the aileron and rudder axis motors contribute rotation. It is now seen that the three motors set forth will contribute rotation of the cockpit into those positions that are required. It will be well to note at this time that the size of the standards 55 is such that it is possible to make a complete revolution of the bracket 41 relatively thereto, carrying with the said bracket 41, the bracket 11 and cockpit 10. It will now be understood why it is necessary to have the series of brushes 22, 22a and rings 21, 21a, since without such an arrangement it would be impossible to conduct electricity to the several operating parts of the machine already described and to be described presently.

A further series of conventional contact rings R rotate with shaft 54 and are adapted for contact with a series of conventional brushes (not shown) that are carried on a bracket 55a fixed to one of brackets 55. It is obvious that through rings R and the brushes in contact therewith, electric current is supplied to all the parts movable with bracket 41 and including motor 42, cockpit 10, etc., as will presently appear.

Mounted within the cockpit 10 is what I term a stick 60, accessible for operation by a pilot on seat S. This stick may be of the conventional type with which pilots are familiar, and preferably has the conventional handle 61 and shaft 61a for rotating a gear 62 and pinion 63 in place of the usual aileron controls. Pinion 63 when rotated acts to rotate the contact finger 64 relatively to the circular resistance 65 that is center grounded at Gr. In the neutral position of the cockpit shown in Fig. 1, and with the stick shaft 61a in a neutral rotated position, the contact finger 64 will be on the center of resistance 65 and therefore will be grounded at Gr. The slightest rotation of the shaft 61a by handle 61 of stick 60 will move the contact finger 64 from its grounded position of Figs. 2 and 7 into contact with one side or the other of the circular resistance 65 for a purpose presently set forth.

Stick 60 is pivotally movable bodily about the axis of a shaft 66 relatively to a standard 66a fixed to the cockpit. Movement about shaft 66 is equivalent to that movement which in an actual airship is adapted to control the elevators, while as already set forth the rotary movement of the shaft 61a is the equivalent of that movement which is used for moving the ailerons of an airship. Rotatable with the stick 60 about shaft 66 is the gear sector 68 that is in engagement with pinion 68a. Pinion 68a rotates a contact finger 67 relatively to a circular resistance 69 center grounded at Gr. Any movement of the stick 60 about shaft 66 will establish a circuit through one side or the other of circular resistance 69 as hereinafter set forth.

Mounted also for rotation within the cockpit is a rudder bar 70 having the usual foot pedals 71. A gear segment 72 rotatable with the rudder bar 70 is in engagement with a pinion 73 for rotating the shaft 74. The shaft 74 carries a contact finger 75 that rotates relatively to a center grounded circular resistance 76. Any rotation of the rudder bar 70 will move the finger 75 to establish a flow of current through one side or the other of circular resistance 76.

I shall now refer to Fig. 7 in order to describe the operation of my apparatus. In Fig. 7 all of the essential parts of Figs. 1–6 are shown, and actually, a clear and comprehensive understanding of my invention is possible from a study of Fig. 7 taken alone. In other words, the mechanical means of Figs. 1–6 are shown merely to facilitate an understanding of the invention, but those skilled in the art will readily be able to practice the invention from a study of Fig. 7, since many forms of mechanical means will readily occur to one appreciating the conception of my contribution.

With the cockpit in the neutral position of Fig. 1, and with the controls as shown in Fig. 7, it will be noted that contacts 64, 67 and 75 of the aileron, elevator and rudder controls are in a position so that no current will flow through the several circular resistances with which they are in contact. The A. C. source of current is shown having three transformers T, T¹ and T². One of the secondary coils 77 of transformer T has one terminal leading to the common ground Gr while its other terminal is conductor A that leads through a resistance 78 to contact finger 67. With the elevator contact finger 67 in neutral the current will merely flow through the resistance 78 to the ground Gr. If the stick 60 is rotated about shaft 66, the finger 67 will contact resistance 69 and current will then flow from the transformer secondary 77, conductor A, finger 67 and through one side or the other of the resistance 69. It will also flow in parallel to the common ground Gr.

If the stick be pulled toward the student, as will be done when it is desired to elevate the nose of the plane, current will flow through the left side of resistance 69 in parallel to ground Gr to the center of resistance 27. Because the cockpit is in its neutral position of Fig. 1 in the aileron axis, resistance 27 will be in its position relatvely to brush 39 shown in Fig. 7 and current will then flow through a segment 28, the brush 39 and conductor G to resistance 47. Because the cockpit is in its neutral position in the rudder axis, the resistance 47 will be in that relation to the brush 51 illustrated in Fig. 7. Therefore, current will flow through one of the segments 49, brush 51 to the primary coil 80 of the transformer 81. The secondary 82 of the transformer 81 is in the circuit of the grid 83 of a thyratron tube 84. The excitation of the grid 83 will of course effect a flow of current from the secondary 89 of transformer T, through the plate 85 of the tube 84 to the filament 86, elevator motor 56, conductor 87 and back to the secondary coil 89. This will effect the actuation of the elevator motor 56 for rotating the cockpit about the axis of the shafts 53, 54 until the operator restores the stick to its neutral position.

If we assume that when the operator moved the stick as herein above set forth, the cockpit was facing in a direction exactly 180° from the direction it is shown facing in Fig. 1, then the following would have happened. The current flowing from the brush 39 and conductor G into resistance 47 would have moved to brush 52 because the relationship of the resistances 47 and 48 relatively to brushes 51, 52 would be reversed through the rotation of the cockpit 10 and shaft 40. With the current flowing through brush 52, it would have entered primary 90 of the transformer 91. It is quite apparent that the primary 90 of the transformer 91 is in reversed phase relation to the primary of transformer 81. Therefore, the phase of the current in secondary 92 will be exactly opposite that of secondary 82. Since the secondary 92 is in the circuit of grid 83a of thyratron tube 84a it is obvious that current would flow through the elevator motor 56 in exactly the opposite direction from that in which it flows when grid 83 is in control. Therefore, the motor 56 would rotate in exactly the opposite direction, but the nose of the cockpit would lift exactly in the same way as previously, except when brackets 11 and 41 are parallel, as hereinafter explained, because a reversed direction of rotation of the motor is necessary to raise the cockpit nose when the cockpit is facing 180° from that of its position in Fig. 1.

It is now important to see what happens if the stick is moved from its neutral position of Fig. 7 when the cockpit is rotated 90° from Fig. 1 in its aileron axis. It will be appreciated that when the cockpit is so rotated it is in the position of an actual airship having its wings vertical and flying on its side. With the parts in the particular position current will flow from the stick to the resistance 27 as before. That resistance, instead of being centered opposite brush 39, would have its center aligned with brush 38 because the resistance 27 will have rotated 90° with the cockpit and shaft 12 from its position of Figs. 1 and 7. Current will therefore flow from the resistance 27, the central segment 28, brush 38 and conductor H to the primary 95 of a transformer 96.

The secondary of the transformer 96 designated by reference numeral 97, is in the circuit of the grid 98 of a thyratron tube 99. Current will therefore flow from the secondary 100 of the transformer T¹ through the plate 101, filament 102, rudder motor 42 and back to secondary 100. In other words, it would be the rudder motor 42 that would be actuated by the stick in a particular direction under the conditions outlined, rather than the elevator motor as before.

Let us say that under the particular conditions thus set forth; that is, with the cockpit rotated 90° in its aileron axis, the stick is moved in a direction opposite to that hereinabove set forth. Current will then flow from the alternating current source through the finger 67 into the right hand side of the resistance 69 to resistance 25. Resistance 25 will be rotated 90° counterclockwise from its position of Fig. 7 so that instead of its center segment 26 being in contact with the brush 37, it will be in contact with the brush 36. Current will therefore flow through the brush 36, conductor F to the primary 103 of the transformer 104. The primary 103 is in reversed phase relation to primary 95 so that the current flowing through the secondary 105 will be in opposed phase relation to that flowing through secondary 97. The grid 98a will therefore effect a flow of current in the rudder motor in a direction exactly opposite that previously set forth so that the cockpit 10 will move in exactly the opposite direction.

I have now set forth exactly what happens when the stick is moved in one direction with the cockpit in neutral as in Fig. 1, with the cockpit rotated 180° in its rudder axis from the position of Fig. 1, and when the cockpit is 90° from its position of Fig. 1 in the aileron axis. I have also set forth just what happens when the stick is moved in an opposite direction.

The rudder bar controls the rudder axis motor and the elevator axis motor in exactly the same way as does the stick, but in an opposed relation. It will be well to go through one of the control operations utilizing the rudder bar. With the cockpit in the position of Fig. 1, should the rudder bar be rotated to the left or counterclockwise from its position of Fig. 7, current will flow through conductor B and resistance 78a from the secondary coil 110 of the transformer T¹ to the contact 75. Contact 75 will move from its grounded position into electrical contact with the left half of resistance 76 and will direct current to the resistance 31. Current will flow from the resistance 31 through its center segment 33, brush 36, conductor F, to the primary 103 of the transformer 104. The rudder motor 42 will obviously then be actuated for movement in the desired direction as was earlier explained. It is obvious that an opposite movement of the rudder bar 70 under the conditions set forth will effect an opposite movement of the rudder motor.

Under all of the conditions set forth heretofore, the several brushes 36—39 have been in contact with but one of the resistances 25, 27, 30, 31 rotatable about the aileron axis and shafts 12, due to the fact that the cockpit was set forth as being in a position for movement by the elevator motor or the rudder motor only. A further important feature of the invention will now be set forth. If the cockpit is rotated in its aileron axis 45° from its neutral position of Fig. 1 and the stick is moved counterclockwise about shaft 66, current will flow from the A. C. source through the finger 67 to the left hand portion of the resistance 69 to resistance 27. Resistance 27, having rotated 45° also, will then have one of its segments 28 against brush 39, and another one of its segments 28 in contact with brush 38. Naturally, the flow of current to the brush 39 will be decreased because some of resistance 27 will be in the circuit. Therefore, the current that will flow from the brush 39 to conductor G and then through resistance 47, brush 51 and primary 80 of transformer 81 will be less than heretofore set forth.

Therefore, the operation of the elevator motor

56 will be at a slower speed. In this way, the same effect is obtained as in an actual ship because at 45° from the position of Fig. 1 the response of an actual ship to its elevators is considerably less than in Fig. 1. Current will of course also flow through brush 38 and conductor H to primary 95 of the transformer 96. This flow of current will also be decreased from that heretofore set forth because of the presence in the circuit of some of the resistance 27. Therefore, through thyratron tube 99 the actuation of the rudder motor 42 will be at a slower speed. In other words, the stick will actually control both the elevator and rudder motors in order to give that movement to the cockpit that is imparted to an actual plane by stick movement when the actual plane is rotated 45° by its ailerons from the position of Fig. 1.

The rudder bar will similarly but oppositely control both the rudder axis and elevator axis motors as is probably now clearly apparent. When the rudder bar and stick are both actuated, as in the 45° position just set forth, it is of course the resultant of the current flows set up that will control the elevator and rudder axis motors. This also seems rather apparent and should be clear without further description.

It will of course be noted that the elevator motor was again controlled by the position of the direction control resistances 47 and 48 in the axis of the shaft 40 or the rudder motor axis. It is well to note that more or less of resistances 47, 48 may be placed in the circuit of the elevator motor depending on the position of the cockpit in the rudder axis. This is required in order to control the motor to impart that degree of operation which will be proportional to the elevator action in an actual plane. It is well to indicate here that reactances and capacities may be used in the place of resistances in the several places where resistances have heretofore been set forth. It will also be well to note that while the position of the cockpit in the rudder axis controls the direction of operation of the elevator axis motor the opposite is not true.

The aileron operation, or the actuation of the aileron motor 13, is exceedingly simple because it is direct and independent. Thus, a rotation of the shaft 61a of the stick and its contact 64 will effect flow from the secondary 115 of transformer T² in one direction or the other by way of conductor C through resistance 78b, contact 64, and the left or right portion of the circular resistance 65. If the flow is to the right, current will pass through the conductor D and into the primary 116 of the transformer 117. The secondary coil 118 of the transformer 117 is in the circuit of the grid 119 and the excitation of the grid will cause current to flow from the secondary 120 of the transformer T² through the plate 121, filament 122, aileron motor 13 and back to the secondary 120.

Movement of the contact finger 64 in the opposite direction will effect the flow of current through the conductor E and to the primary 125 of the transformer 126. Primary 125 being in reversed phase relation to primary 116, secondary 127 will be in similar reversed relation to secondary 118. Therefore, the control of the grid 119a will effect a flow of current through the aileron motor 13 in a direction exactly opposite that herein above set forth.

Those skilled in the art will of course appreciate that the three motors, 13, 42 and 56 have fields that are separately excited so that the thyratron tubes control the direction and magnitude of current flow in the armatures, and therefore the direction of rotation of said motors as set forth.

It will be remembered that in the preferred form of my invention just described, the cockpit 10 is rotatable about its aileron axis relatively to a bracket 11, and that the bracket 11 is then rotatable about the axis of a shaft 40 relatively to a bracket 41. The rotation about the axis of shaft 40 is contributed by the rudder axis motor 42, the control of this motor being effected through the stick or the rudder bar depending upon the position of the cockpit 10 in the aileron axis. The bracket 41 is, in turn, rotatable together with the bracket 11 and cockpit 10 in what is termed the elevation axis, by the elevation axis motor 56. Because of this relationship of the three axes, it will be remembered that the rotation of the bracket 11 about the axis of shaft 40 was effective to control the direction of rotation of the motor 56. This control of the direction of rotation of the motor 56, it will be recalled, is accomplished through the resistances 47, 48 rotatable in the axis of the shaft 40 with the cockpit 10 and the bracket 11.

In my modification illustrated in Figs. 8 and 9, the relationship of the elevator axis motor and the rudder axis motor is reversed. Thus, the rudder axis motor functions to rotate the cockpit together with the elevator axis motor and the bracket associated therewith, whenever the rudder axis motor is actuated. Therefore, in my modification, instead of the rudder axis motor controlling the direction of rotation of the elevator axis motor as in my first form, it is the elevator axis motor and rotation by that motor of the cockpit, that controls the direction of operation of the rudder axis motor.

Referring now to Figs. 8 and 9 more particularly, I shall describe my second form using so far as is possible the same structural elements that are illustrated in Figs. 1 to 6 inclusive, and which are shown in operating relationship in Fig. 7. The cockpit of my second form is designated by reference numeral 150 and is rotatable on shafts 151 and 152 relatively to a bracket 153. This rotation is of course rotation in the aileron axis and is similar to rotation of cockpit 10 about its forward and rearward shafts 12. The aileron axis motor of my second form is designated by reference numeral 154 and acts to rotate the cockpit 150 in substantially the same manner and through the same means as are indicated particularly in Fig. 5 showing the first form. The bracket 153 is mounted for rotation through shafts 155, 156 relatively to a bracket 157. Rotation on the said shafts 155, 156 is contributed by a motor 158 that in my second form is termed the elevator axis motor and is the equivalent of the motor 56 of the first form. It acts to rotate the bracket 153 through suitable mechanism similar to that earlier described in connection with the first form. The bracket 157 together with the elevator axis motor, the bracket 153 and cockpit 150 are rotatable as a unit relatively to a standard 159 through the medium of a vertical shaft 160. This rotation is contributed by a motor 165 that is the rudder axis motor of my second form. Rotation of the shaft 160 is, of course, accomplished through suitable gearing 161 in accordance with the teachings of my invention already set forth.

From the description of my second form thus far set forth, it will be perceived that the relationship between the elevator axis motor 158 and the rudder axis motor 165 is the exact opposite of the relationship of the elevator axis motor 56 and rudder axis motor 42 of the first form. Therefore, as already outlined, the direction control for the rudder axis motor 165 must be located in the axis of shafts 155, 156 constituting the elevator axis of the second form.

For this reason, in Fig. 9 it will be noted that I have a series of brushes 22m that are fixed to a bracket 157a forming an integral part of bracket 157. The brushes 22m are the full equivalent of the several brushes 22a of the first form best shown in Fig. 5. These brushes 22m cooperate with a series of rings 21m that are exactly the same in function and operation as the rings 21a of the first form, also best shown in Fig. 5. An insulation ring 45m is mounted for rotation with rings 21m on shaft 156 in exactly the same manner as insulation ring 45 is mounted on shaft 40 in Fig. 5, illustrating the first form. The insulation ring 45m carries resistances like resistances 47, 48 that are adapted for contact with brushes 51m and 52m that cooperate therewith in exactly the same manner as brushes 51, 52 cooperate with resistances 47, 48 of the insulation ring 45. Therefore, the resistances 47 and 48 through their rotation in the elevator motor axis will act to control the direction of rotation of the rudder motor 165 in exactly the same way that the resistances 47, 48 of the first form act to control the direction of rotation of the elevator axis motor. Thus, when the cockpit of Fig. 8 is rotated 180° clockwise from its position there shown, the movement of the rudder bar will effect a proper directional operation of rudder axis motor 165 only because of the control exercised by resistances 47, 48.

Referring now to Fig. 8, there is shown there in its upper left portion, electrical apparatus that is exactly the same as that illustrated in the upper left portion of Fig. 5. Thus, in Fig. 8 the shaft 152 will carry therewith an insulation ring 23m exactly the same as ring 23 shown in Fig. 5. The ring 23m will carry four resistances that will be the same in construction and operation as resistances 25, 27, 30, 31 of the first form. These resistances will, of course, cooperate with a series of four brushes in the same manner as in the first form, two of these brushes being shown and bearing reference numerals 36m and 38m and corresponding to brushes 36 and 38 of the first form. The shaft 152 will, of course, carry a series of rings 21' that are exactly the same in function as the rings 21 of Fig. 5, and these rings will cooperate with brushes 22' that are the same as the brushes 22 of the first form. In other words, the control means rotatable with the shaft 152 in Fig. 8 are exactly the same as those rotating with the rear shaft 12 in Fig. 5 and are similarly adapted to determine whether the stick or rudder bar will control either one or both the elevator axis and rudder axis motors, and the degree of said control.

At 166 in Fig. 9 there is shown mechanism similar to that illustrated at R and 55a in Fig. 1 for carrying current to the electrical mechanism in the cockpit and to the motors and other controls rotatable with the bracket 157. Mechanism 166 will preferably comprise a series of brushes 167, secured to a bracket 168 forming an integral part of the bracket 157. The brushes 167 will, of course, collect current from a series of stationary rings 169 in accordance with the practice common in the electrical arts. It may be well at this point to reiterate that the particular mechanism I have illustrated and which I prefer to utilize is not an essential part of my invention and that the essence of my invention is really best set forth in Fig. 7. Of course, in studying the form of Figs. 8 and 9 it will be necessary to appreciate that the direction control mechanism of Fig. 7 rotatable in the axis of shaft 40, will instead be rotatable in the elevator axis by motor 158 and on shafts 155, 156.

There is an operating relationship between the first form of my invention and the second form that will be interesting to note, because each form is particularly practical for different manipulation of the cockpit associated therewith. Thus, in each form the cockpit is not readily maneuverable in certain positions thereof and a particular form will be chosen in accordance with the maneuvers which the student pilot must be taught.

Referring to Fig. 1, it will be noted that if the bracket 11 and cockpit 10 are rotated by rudder axis motor 42 in a clockwise direction about the axis of shaft 40, the shafts 12 will be brought into the same vertical plane as shafts 53, 54. In this position of the cockpit, a depression or raising of the stick cannot effect a movement of the cockpit 10 by the elevator axis motor 56. This is readily apparent. In the form of Fig. 8, the cockpit may be rotated upwardly or downwardly in answer to the movement of the stick in all the positions to which it may be rotated by the rudder axis motor 165. This is quite apparent from Fig. 9 where it will be seen that regardless of the position of the bracket 157, the bracket 153 may be rotated relatively thereto on shafts 155, 156 by elevator axis motor 158.

However, in the form of Figs. 8 and 9 there is one position in which the cockpit 150 is not movable in answer to the controls. Thus, if the cockpit is rotated in Fig. 8 about shafts 155, 156 in a clockwise direction, the shafts 151 and 152 will be brought into a position in line with the shaft 160. If, in this position of the cockpit the pilot rotates his stick 60a to effect movement of the cockpit about the aileron axis to his right, he will then be in the same relation to the shaft 160 as when his cockpit is rotated to the inoperative position relatively to shafts 53, 54 in the first form. In this position reachable in the form of Figs. 8 and 9, a movement of the stick toward or from the pilot that would normally effect upward or downward movement of the cockpit, will of course be ineffective for the same reasons as set forth in the first form.

The stick 60a and the rudder bar 70a of the second form are, of course, exactly the same as that described in connection with the first form and are accessible to a pilot on seat S¹ as fully illustrated in Figs. 2, 3 and 4. The particular controls associated with the stick and rudder bar will be the same in the form of Figs. 8 and 9 as in the first form and will function in exactly the same manner. It is reiterated that the differences between the first and second forms reside in the change of the position of the direction control, and of the bracket mounting arrangement that makes the change in the direction control position necessary. It is not thought that a further detailed description of the second form will now be necessary.

I now claim:

1. In a grounded aviation trainer, a cockpit, electric motor means for rotating said cockpit about a predetermined axis, a stick and a rudder bar for said cockpit, an electric circuit between said stick and said motor means and also between said rudder bar and said motor means whereby electric current is fed to said motor means under the control of said stick and said rudder bar.

2. In a grounded aviation trainer, a cockpit, electric motor means for rotating said cockpit about a predetermined axis, means for rotating said cockpit about a second axis, a stick and a rudder bar for said cockpit, an electric circuit between said stick and said motor means and also between said rubber bar and said motor means whereby electric current is fed to said motor means under the control of said stick and said rudder bar, and control mechanism for said electric circuits including means rotatable coincidentally with said cockpit in said second axis.

3. In a grounded aviation trainer, a cockpit, electric motor means for rotating said cockpit about a predetermined axis, means for rotating said cockpit about a second axis, a stick and a rudder bar for said cockpit, an electric circuit between said stick and said motor means and also between said rudder bar and said motor means whereby electric current is fed to said motor means under the control of said stick and said rudder bar, control mechanism for said electric circuits including means rotatable coincidentally with said cockpit in said second axis, said control means closing a circuit for control by said stick when said cockpit is in one rotated position in said second axis, and closing a circuit for control by said rudder bar when said cockpit is in a position in said second axis 90° from said first position, said control means closing circuits for control by both said stick and rudder bar in positions of said cockpit intermediate said two positions.

4. In a grounded aviation trainer, a cockpit, electric motor means for rotating said cockpit about a predetermined axis, means for rotating said cockpit about a second axis, a stick and a rudder bar for said cockpit, an electric circuit between said stick and said motor means and also between said rudder bar and said motor means whereby electric current is fed to said motor means under the control of said stick and said rudder bar, control mechanism for said electric circuits including means rotatable coincidentally with said cockpit in said second axis, said control means closing a circuit for control by said stick when said cockpit is in one rotated position in said second axis, and closing a circuit for control by said rudder bar when said cockpit is in a position in said second axis 90° from said first position, said control means closing circuits to both said stick and rudder bar in positions of said cockpit intermediate said two positions, and said circuits including further controls whereby the greater the angular displacement of said cockpit from said first position the less will be the control effected by said stick while the greater the angular displacement thereof from said second position, the less will be the control effected by said rudder bar.

5. In a grounded aviation trainer, a cockpin, electric motor means for rotating said cockpit about a predetermined axis, means for rotating said cockpit about a second axis, a stick and a rudder bar for said cockpit, an electric circuit between said stick and said motor means and also between said rudder bar and said motor means whereby electric current is fed to said motor means under the control of said stick and said rudder bar with the degree of throw of the stick or rudder bar determining the speed of response of said motor means for rotating the cockpit about said predetermined axis, commutator segments and contacts positioned for relative rotation in said second axis and with said relative rotation coincidental with the rotation of said cockpit in said second axis, said commutator segments and contacts closing a circuit for control by said stick when said cockpit is in one rotated position in said second axis, and closing a circuit for control by said rudder bar when said cockpit is in a position in said second axis 90° from said first position, said commutator segments and contacts closing circuits to both said stick and rudder bar in positions of said cockpit intermediate said two positions, and resistances cut into and out of said circuits by said commutator segments and contacts whereby the greater the angular displacement of said cockpit from said first position the less will be the control effected by said stick while the greater the angular displacement thereof from said second position, the less will be the control effected by said rudder bar.

6. In a grounded aviation trainer, a cockpit, a thyratron controlled motor for rotating said cockpit about a predetermined axis, means for rotating said cockpit about a second axis, a stick and a rudder bar for said cockpit, electric circuits whereby said stick and said rudder bar control the direction and operation of said motor and whereby said motor moves the cockpit about said predetermined axis dependent on its rotated position in said second axis, to simulate the actual control of a plane by a stick and rudder bar, and controls for the circuits including said thyratron controlled motor and said stick and rudder bar whereby said thyratron controlled motor responds to said stick in one rotated position of said cockpit in said second axis, and to said rudder bar in a second position 90° from said first position in said second axis, and to both said stick and rudder bar in positions intermediate said two positions.

7. In a grounded aviation trainer, a cockpit, electric motor means for rotating said cockpit about a predetermined axis, means for rotating said cockpit about a second axis, a stick and a rudder bar for said cockpit, an electric circuit between said stick and said motor means and also between said rudder bar and said motor means whereby electric current is fed to said motor means under the control of said stick and said rudder bar, and means interconnecting said stick and the means for rotating said cockpit about the second axis whereby said stick controls also the means for rotating said cockpit about said second axis.

8. In a grounded aviation trainer, a cockpit, electric motor means for rotating said cockpit about a predetermined axis, means for rotating said cockpit about a second axis, a stick and a rudder bar for said cockpit, an electric circuit between said stick and said motor means and also between said rudder bar and said motor means whereby electric current is fed to said motor means under the control of said stick and said rudder bar, control mechanism for said electric circuits including means rotatable coincidentally with said cockpit in said second axis, said control means closing a circuit for control by said stick when said cockpit is in one rotated position in said second axis, and closing a circuit for control by said rudder bar when said cockpit is in a position in said second axis 90° from said first position, said control means closing circuits to both said stick and rudder bar in positions of said cockpit intermediate said two positions, means for rotating said cockpit about a third axis, and control means rotatable coincidentally with said cockpit in said third axis for controlling the direction of operation of said motor.

9. In a grounded aviation trainer, a cockpit, a thyratron controlled motor for rotating said cockpit about a predetermined axis, means for rotating said cockpit about a second axis, a stick and a rudder bar for said cockpit, electric circuits whereby said stick and said rudder bar control the direction and operation of said motor and whereby said motor moves the cockpit about said predetermined axis dependent on its rotated position in said second axis to simulate the actual control of a plane by a stick and rudder bar, controls for said electric circuits whereby said thyratron controlled motor responds only to said stick in one rotated position of said cockpit in said second axis, and only to said rudder bar in a second position 90° from said first position in said second axis, and to both said stick and rudder bar in positions intermediate said two positions, said control means including means rotated in said second axis coincidentally with said cockpit for determining the extent of the control of said motor by said stick and rudder dependent on the position of said cockpit in said second axis, means for rotating said cockpit about a third axis, and control means rotatable coincidentally with said cockpit in said third axis for controlling the direction of operation of said motor.

10. In a grounded aviation trainer, a cockpit, a motor means for rotating said cockpit about a predetermined axis for contributing motion thereto corresponding to motion contributed to an airship by movement of its stick when the ship is flying with its wings horizontal, a second motor means for rotating said cockpit about a second axis for contributing motion thereto corresponding to motion contributed to an airship by movement of its rudder when the ship is flying with its wings horizontal, a stick and a rudder bar for said cockpit, a third motor means for rotating said cockpit in an axis in the same manner as a ship is rotated by its ailerons, control means interconnecting said stick and said first and second motor means whereby said stick controls said first motor means when said cockpit is positioned in said third axis corresponding to a ship with its wings horizontal, and whereby said stick controls said second motor means when said cockpit is positioned in said third axis corresponding to a ship with its wings vertical, and means including control means responsive to the position of said cockpit about said third axis interconnecting said rudder bar and said first and second motor means whereby said rudder bar controls said second and first motor means respectively in said two positions.

11. In a grounded aviation trainer, a cockpit, a motor means for rotating said cockpit about a predetermined axis for contributing motion thereto corresponding to motion contributed to an air ship by movement of its stick when the ship is flying with its wings horizontal, a second motor means for rotating said cockpit about a second axis for contributing motion thereto corresponding to motion contributed to an air ship by movement of its rudder bar when the ship is flying with its wings horizontal, a stick and a rudder bar for said cockpit, a third motor means for rotating said cockpit in an axis in the same manner as a ship is rotated by its ailerons, control means interconnecting said stick and said first and second motor means whereby said stick controls said first motor means when said cockpit is positioned in said third axis corresponding to a ship with its wings horizontal, and whereby said stick controls said second motor means when said cockpit is positioned in said third axis corresponding to a ship with its wings vertical, means including control means responsive to the position of said cockpit about said third axis interconnecting said rudder bar and said first and second motor means whereby said rudder bar controls said second and first motor means respectively in said two positions, and means interconnecting said stick and said third motor whereby said stick controls said third motor in all positions of said cockpit.

12. In a grounded aviation trainer, a cockpit, a motor means for rotating said cockpit about one axis, a second motor means for rotating said cockpit about a second axis, means for rotating said cockpit in a third axis, a stick in said cockpit for controlling the operation of either one or both of said motors, a rudder bar for controlling the operation of either one or both of said motors, means responsive to the position of said cockpit about said third axis and connected to said motors whereby when said cockpit is in one position in said third axis one of said motors is controlled only by the stick while the other is controlled only by the rudder bar, and both said motors are controlled by the stick and rudder bar in positions of said cockpit rotated clockwise and counterclockwise from said position.

13. In a grounded aviation trainer, a cockpit, a thyratron controlled motor for rotating said cockpit about a predetermined axis, a control circuit for said motor including thyratron tubes, means for rotating said cockpit about a second axis, a stick in said cockpit, a rudder bar in said cockpit, means for directing an electric current toward the grids of said tubes when said stick is moved, means for directing an electric current toward the grids of said tubes when said rudder bar is moved, and control means rotatable with said cockpit in said second axis for energizing said grids with said current directed by said stick when said stick is moved and said cockpit is in one position in said second axis, said control means energizing said grids with said rudder bar directed current when said rudder bar is moved and said cockpit is in a second position in said second axis, said control means energizing said grids with the resultant of the currents directed by both said stick and rudder bar when said cockpit is in positions in said second axis intermediate said one position and said second position.

14. In a grounded aviation trainer, a cockpit, a thyratron controlled motor for rotating said cockpit about one axis, a second thyratron controlled motor for rotating said cockpit about a second axis, means for rotating said cockpit about a third axis, control circuits for said motors including thyratron tubes, a stick in said cockpit, a rudder bar in said cockpit, current flow means controlled by said stick and rudder bar, means for directing an electric current toward the grids of certain of said tubes from said stick current flow control means when said cockpit is in one position in said third axis and towards others of said tubes when said cockpit is in a second position in said third axis, and towards all of said tubes when said cockpit is in positions in said third axis intermediate said two positions, and means for directing an electric current toward the grids of said other tubes from said rudder current flow means when said cockpit is in said one position and towards said certain tubes when said cockpit is in said second position, and to all said tubes when said cockpit is in said intermediate positions.

MURRAY W. EDINBURG.

REFERENCES CITED

The following references are of record in the file of this patent:

UNITED STATES PATENTS

| Number | Name | Date |
|---|---|---|
| 1,042,693 | Kramer | Oct. 29, 1912 |
| 1,342,871 | Ruggles | June 8, 1920 |
| 1,393,456 | Ruggles | Oct. 11, 1921 |
| 1,865,828 | Buckley | July 5, 1932 |
| 2,063,231 | | |
| 2,099,857 | | |
| 2,153,986 | | |
| 2,155,346 | | |
| 2,316,181 | | |
| 2,319,115 | | |
| 2,323,322 | | |
| 2,336,711 | | |
| 2,358,016 | | |
| 2,366,603 | | |
| 2,369,418 | | |

| Number | Name | Date |
|---|---|---|
| | Custer | Dec. 8, 1936 |
| | Link | Nov. 23, 1937 |
| | MacLaren | Apr. 11, 1939 |
| | Davis | Apr. 18, 1939 |
| | Ocker | Apr. 13, 1943 |
| | Crowell | May 11, 1943 |
| | Geisse | July 6, 1943 |
| | Barber | Dec. 14, 1943 |
| | Link | Sept. 12, 1944 |
| | Dehmel | Jan. 2, 1945 |
| | St. John | Feb. 13, 1945 |

FOREIGN PATENTS

| Number | Country | Date |
|---|---|---|
| 553,139 | Great Britain | 1943 |